United States Patent [19]

Ogawa et al.

[11] Patent Number: 4,928,300
[45] Date of Patent: May 22, 1990

[54] VIDEOPHONE WITH DETACHABLE TV CAMERA

[75] Inventors: Kohji Ogawa; Mikio Onoki, both of Gunma, Japan

[73] Assignee: Mitsubishi Denki Kabushiki Kaisha, Tokyo, Japan

[21] Appl. No.: 339,805

[22] Filed: Apr. 18, 1989

[30] Foreign Application Priority Data

Jun. 27, 1988 [JP] Japan .................................. 63-158688
Jul. 29, 1988 [JP] Japan .................................. 63-189908

[51] Int. Cl.⁵ ........................ H04M 11/00; H04N 7/14
[52] U.S. Cl. ........................................ 379/53; 358/85
[58] Field of Search ....................... 379/53, 54; 358/85, 358/224, 229

[56] References Cited

U.S. PATENT DOCUMENTS

| 4,291,198 | 9/1981 | Anderson et al. | 379/96 |
| 4,485,400 | 11/1984 | Lemelson et al. | 358/85 |
| 4,715,059 | 12/1987 | Cooper-Hart et al. | 379/53 |
| 4,739,413 | 4/1988 | Meyer | 358/281 |

FOREIGN PATENT DOCUMENTS 0148561 9/1983 Japan .................................. 358/400

Primary Examiner—Jin F. Ng
Assistant Examiner—Wing F. Chan
Attorney, Agent, or Firm—Wolf, Greenfield & Sacks

[57] ABSTRACT

A videophone is provided wherein a TV camera is detachable from the videophone unit for the purpose of facilitating the operation of the TV camera when imaging subjects other than the user.

9 Claims, 7 Drawing Sheets

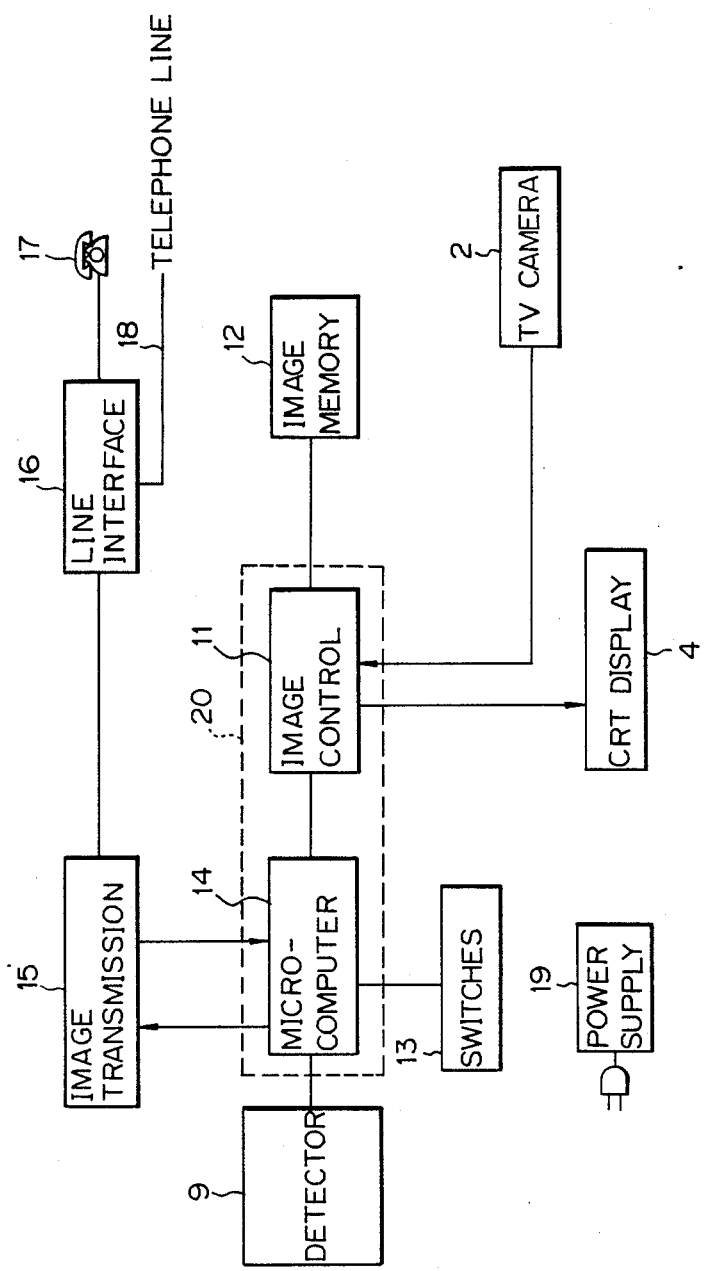

|  | INSERTED | DETACHED |
|---|---|---|
| OUTPUT OF TV CAMERA | ⇨ | ⇨ |
| USER'S IMAGE ON CRT DISPLAY | ⇦ (REFLECTED) | ⇨ |
| USER'S IMAGE TO BE TRANSMITTED | ⇨ | ⇨ |
| IMAGE TRANSMITTED FROM OTHER PARTY | ⇨ | ⇨ |

VIDEOPHONE WITH DETACHABLE TV CAMERA

BACKGROUND OF THE INVENTION

1. Field of the Invention

This invention relates generally to a videophone and, more particularly, to a videophone with a TV camera detachable in such a manner that the operation of the videophone is greatly facilitated.

2. Prior Art

A typical conventional videophone is shown in the perspective view of FIG. 1 in which a TV camera 2 is incorporated in a videophone unit 1, the photosensitive surface of TV camera 2 being disposed on a front surface 3. The videophone unit 1 is provided with a CRT display 4 which functions as an image display means for displaying image data picked-up by a user's own TV camera 2 or image data transmitted from the videophone of another party during video telephone communication via a telephone line. The display surface of the CRT display 4 is disposed on a front surface 3. Variety operation buttons 5 are also provided on the front surface 3.

FIG. 2 is a block diagram depicting the internal constitution of a videophone. In FIG. 2, an image control unit 11 controls the image data picked-up by TV camera 2 and the image data read from an image memory 12. The thus controlled image data are supplied and displayed on CRT display 4. Subsequently, the image data are also delivered to image memory 12 and stored therein.

A group of multiple switches 13 is turned ON/OFF by various operation buttons 5 (FIG. 1). Based on switching signals from switch group 13, a microcomputer 14 functions to take the image data out of image control unit 11 to an image transmission unit 15, and vice versa.

A line interface 16 selectively connects image transmission unit 15 and a telephone 17 to a telephone line 18. The numeral 19 represents a power supply for the videophone unit. It is noted that the image control unit 11 and microcomputer 14 are combined to constitute an image processing unit 20.

The description will next deal with the operation of the videophone. The data of the user's own image formed by TV camera 2 is taken into image control unit 11 and undergoes an inversion process in accordance with a command issued from microcomputer 14 on the basis of the switch signals transmitted from switch group 13. Subsequent to this step, the image data is displayed as a reflected image on CRT display 4.

More specifically, the user's face which faces the videophone 1 is imaged as a true image (the user's face as viewed by the other party) by means of TV camera 2. If the true image were to be displayed directly on the CRT display 4, however, the user who is accustomed to looking at his own image in a mirror may feel it to be quite unnatural. It is thus required that the image be displayed as a reflected image on the CRT display 4. Consequently the abovementioned inversion display is effected.

The image data obtained when imaging a subject other than the user himself by use of TV camera 2 is displayed as a true image directly on CRT display 4 without effecting inversion. Similarly displayed on CRT display 4 is the image data transmitted from the other party in the ongoing video telephone communication to the image control unit 11 via the telephone line, line interface 16, image transmission unit 15 and microcomputer 14.

On the other hand, when transmitting the image data of the user's image formed by TV camera 2 to the other party, the image data from TV camera 2 is temporarily stored in image memory 12 through image control unit 11.

Subsequently, the image data read from image memory 12 is transmitted to the other party via microcomputer 14, image transmission unit 15, line interface 16 and telephone line 18. The image data is then displayed as a true image on the CRT display 4 of the other party.

The thus constructed prior art videophone system is attended by the following problems. If, in addition to the user's face, another subject, e.g., a child who is playing nearby is to be shown, the videophone unit itself has to be moved to direct the TV camera toward the freely moving target subject, because the TV camera is integrally incorporated therein. It is thus rather difficult to direct the TV camera to a target subject.

Accordingly, it is a primary object of the present invention to obviate the foregoing problems and to provide a novel videophone capable of readily directing a TV camera toward a target subject for bringing into focus that target without moving the whole videophone unit, and which is also capable of displaying the user's image as a reflected image while displaying images other than the user's image as true images.

SUMMARY OF THE INVENTION

A videophone according to the present invention is arranged in such a manner that a TV camera is constructed separately from a telephone unit but detachably mounted therein.

The videophone according to the invention includes a detecting means for detecting the state of the TV camera, that is whether or not the TV camera is detached, the detecting means generating a detection signal by means of which an image displayed on a CRT display on the transmitting side is automatically changed to a reflected image or a true image.

A videophone incorporating a further feature of the invention comprises: a TV camera detachably mounted on a telephone unit; a detecting means for detecting whether the TV camera is mounted thereon or demounted therefrom; an image display means; an image memory; and an image processing means for permitting image data formed by the TV camera to be displayed as a reflected image on the image display means by inverting the image data, storing in the image memory a flag indicative of a condition under which the TV camera is fixed, the flag being set in the image data, and displaying as a reflected image the image data read from the image memory on the image display means when a detection signal from the detecting means indicates that the TV camera is accommodated in the telephone unit, and displaying the image data formed by the TV camera and the image data transmitted through a telephone line as true images on the image display means when the detection signal indicates that the TV camera is demounted.

With such an arrangement, the TV camera can be demounted from the telephone unit, and hence a subject other than the user can be imaged with ease. When employing the TV camera in the demounted condition, the appearance of a subject as viewed by the user is displayed as a true image directly on a CRT display in accordance with a detection signal indicating whether the TV camera is mounted or demounted relative to the telephone unit. When the TV camera is mounted thereon, i.e., when imaging the user's face, a reflected image obtained after inversion is displayed on the CRT display.

When the image data formed by the TV camera is stored in the image memory, the image data is stored while setting therein a flag indicative of the condition of the TV camera with respect to the telephone unit. The image based on this image data is selectively displayed as a reflected image or a true image depending on whether the image data read from the image memory is flagged or not.

The invention, as well as other objects and advantages thereof, will become more apparent from the following detailed description of a preferred embodiment in connection with the drawings.

BRIEF DESCRIPTION OF THE DRAWINGS

For a better understanding of the invention, reference is made to the accompanying drawings, in which:

FIG. 3A is a block diagram illustrating the constitution of the videophone shown in FIG. 3;

DESCRIPTION OF THE PREFERRED EMBODIMENTS

Figure 1:
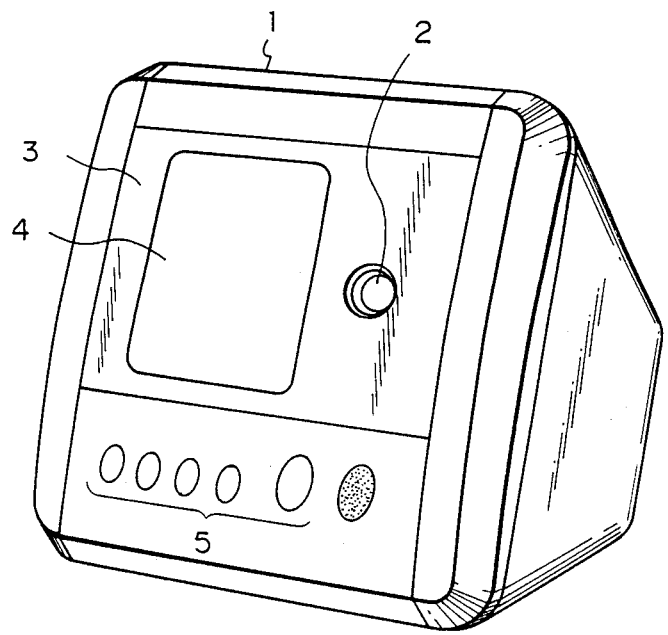
FIG. 1 is a perspective view of a videophone in the prior art.
Figure 2:
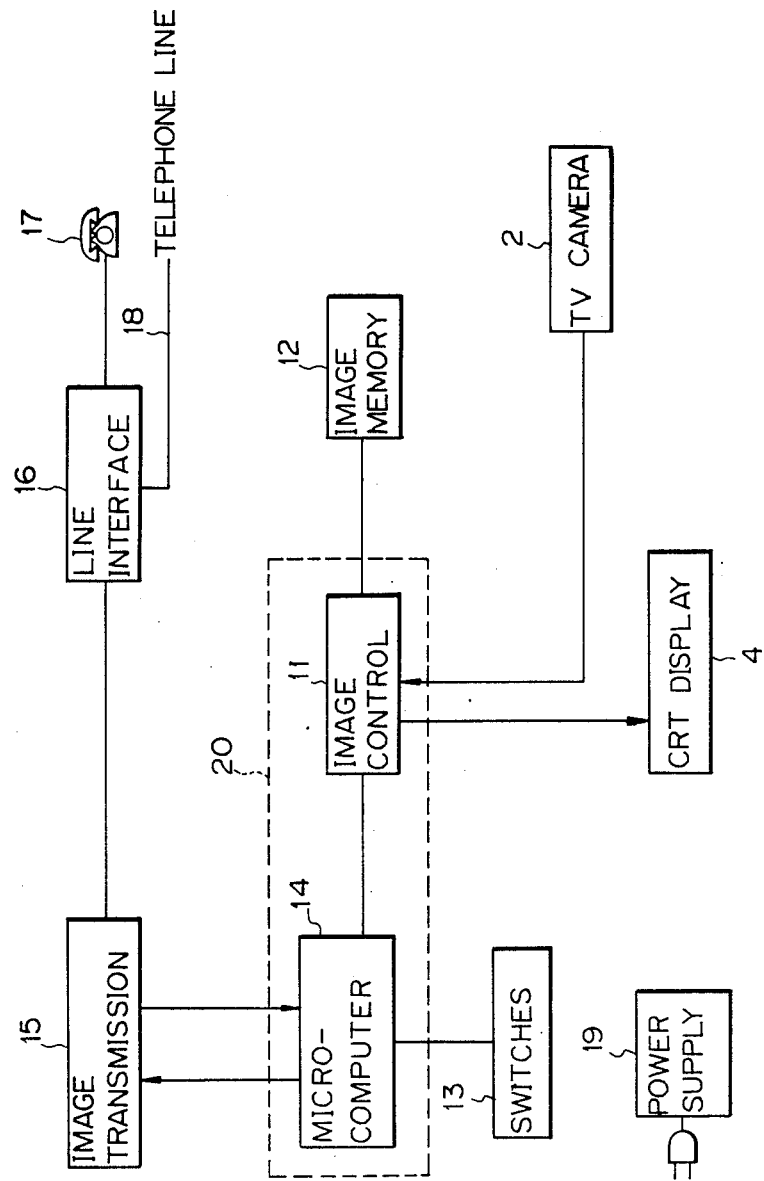
FIG. 2 is a block diagram illustrating the constitution of the videophone shown in FIG. 1.
Figure 3:
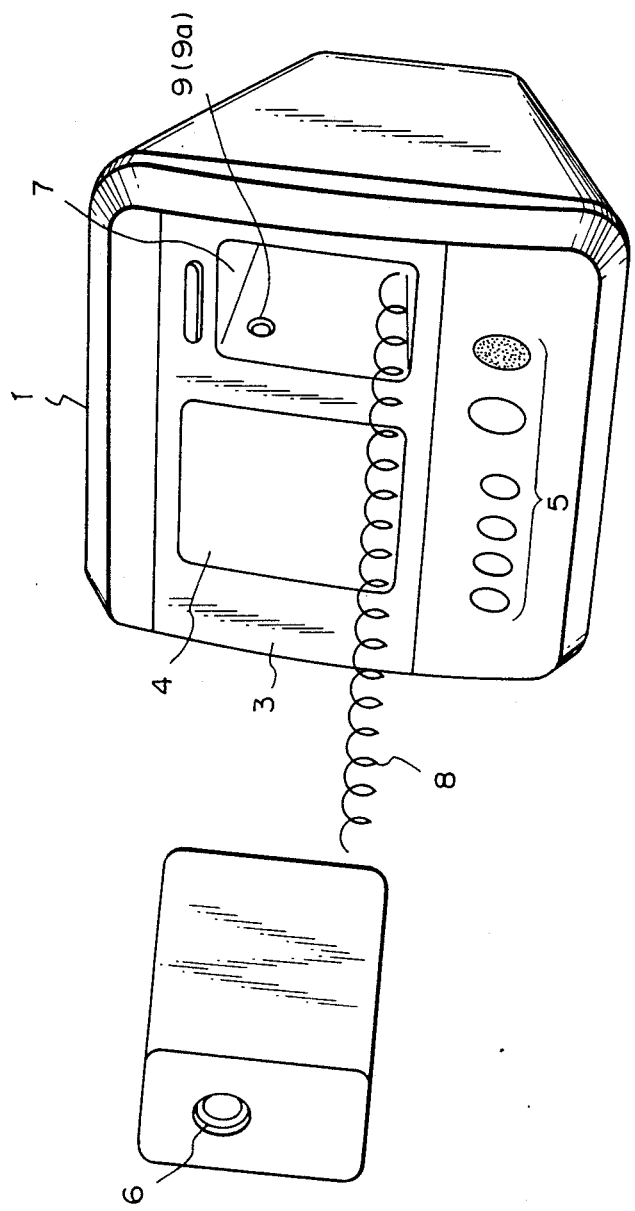
FIG. 3 is a perspective view of a videophone in accordance with the present invention.

Referring first to FIG. 3, there is shown the perspective view of a videophone unit in accordance with the present invention. In FIG. 3, the same reference numerals are used for components which correspond to those shown in FIG. 1.

In FIG. 3, a TV camera 6 is detachable from a videophone unit 1. TV camera 6 may be accommodated in a camera accommodation section 7, the opening of which is formed in a front surface of unit 1. The TV camera is connected through a stretchable signal cable 8 to unit 1, the cable having a spiral configuration and transmitting the image data formed by TV camera 6 to an image control unit incorporated in videophone unit 1.

Attached to an inner wall of the camera accommodation section 7 is a detecting means 9 for detecting whether or not TV camera 6 is installed therein. The detecting means 9 in this embodiment is composed of a light receiving element 9a and a light emitting element (not illustrated) which are disposed in face-to-face fashion. The presence or absence of TV camera 6 in section 7 is detected by checking whether or not the light emitted from the light emitting element to the light detecting element is blocked by TV camera 6.

Next, the operation of the embodiment will be explained as follows. The internal configuration of videophone unit 1 is similar to that in the prior art, and the operation will be described in conjunction with FIG. 3A.

When the user's face is imaged for display and transmission thereof, TV camera 6 is typically used with the camera set in camera accommodation unit 7 of videophone 1. When TV camera 6 is accommodated in camera accommodation unit 7, a detecting means 9 behaves to detect the presence of the TV camera from the fact that the light travelling to the light detecting element has been intercepted. Then, the detecting means supplies microcomputer 14 with a command that the image data should be inverted (to a reflected image).

An image control unit 11 inverts the image data of a user's image generated by TV camera 6 in accordance with the instruction given by microcomputer 14 indicating that the image data should be inverted, and the thus-processed image data is displayed as a reflected image on CRT display 4.

In the case of demounting TV camera 6 from videophone 1 in order to image a subject other than the user himself, detecting means 9 detects the absence of TV camera 6 from the fact that the light emerging from the light emitting element reaches light detecting element 9a and gives microcomputer 14 an instruction to the effect that the inversion of the image data is not necessary.

Thus, in accordance with the instruction from microcomputer 14, the image control unit 11 permits the display of the image data imaged by TV camera 6 on CRT display 4 as a true image identical with the subject's image as observed by the user, unlike the case where the user's face is imaged.

On the other hand, when the image data generated by TV camera 6 is transmitted to the other party in video telephone communication with him through microcomputer 14, an image transmission unit 15, a line interface 16 and a telephone line 18, the image data is transmitted without being inverted irrespective of whether the subject involves the user's face or something also. Thus, the image data is displayed as a true image on the CRT display of the other party.

Figures 4, 6:
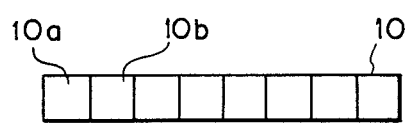
FIG. 4 is a table showing image data as a comparison between the cases where a TV camera is fixed to a videophone unit and detached therefrom with respect to image data from the TV camera, the state of display on a user's own CRT display, image data transmitted to the other party in video telephone communication with the user, and image data sent from the other party.
FIG. 6 shows a pattern in an image register.

FIG. 4 is a table showing a comparison between the case where TV camera 6 is inserted into videophone unit 1 and the case where it is detached therefrom with respect to the output image data supplied from TV camera 6, the display of the user's image on the user's own CRT display, the image data to be transmitted to the other party and the image data sent from the other party. As is obvious from this table, only the image data of the user's face imaged in the state where TV camera 6 is accommodated in videophone unit 1 is displayed as a reflected image after inversion.

Figure 5:
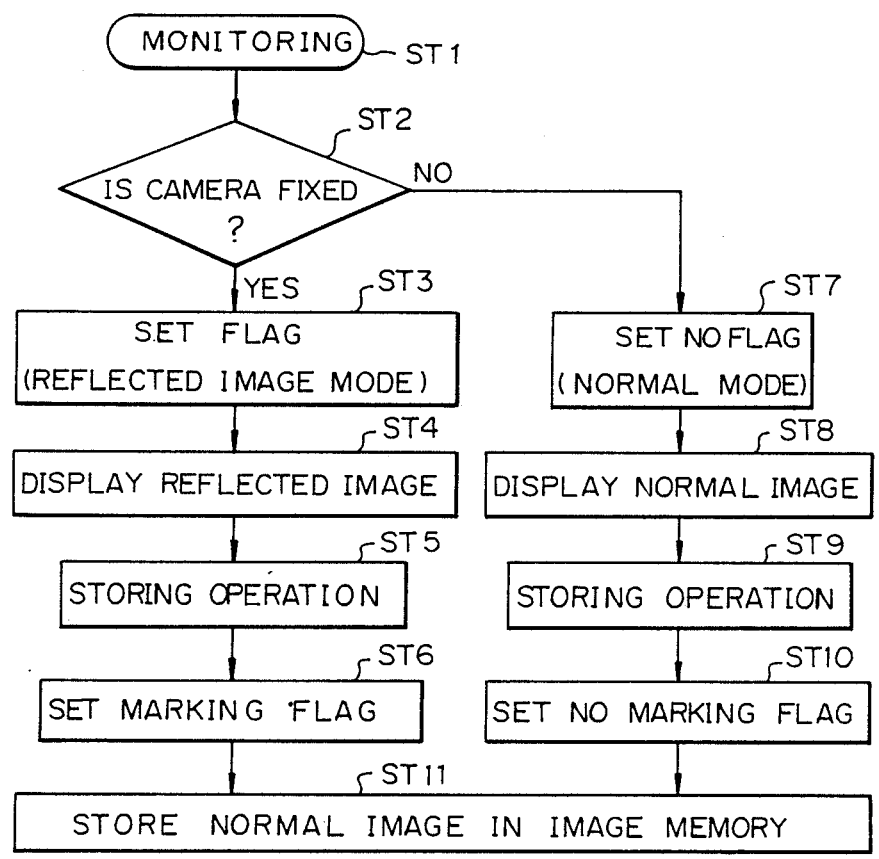
FIG. 5 is a flowchart showing an operation for storing in a memory the image data picked-up by the TV camera.

FIG. 5 is a flowchart showing the operation that takes place when the image data formed by TV camera 6 is stored in image memory 12.

Referring to FIG. 5, when the videophone is used for monitoring moving pictures (step ST1), it is determined whether or not TV camera 6 is fixed (inserted) in videophone unit 1 (step ST2). If fixed, a moving picture flag is set in a moving picture flag region 10a of an image register 10 depicted in FIG. 6 (step ST3). Thus, the image data displayed on CRT display 4 is arranged to be a reflected image with right and left sides reversed (step ST4).

When TV camera 6 is detached from videophone unit 1, the moving picture flag is not set therein (step ST7). The image data displayed on the CRT display becomes a normal "true" image (step ST8).

When TV camera 6 is fixed in videophone unit 1, the image data generated is stored as the normal image (not the reflected image) in image memory 12 after a flag has been set in a marking region 10b of image register 10 (steps ST5, ST6 and ST11).

When TV camera 6 is detached from unit 1, the image data generated is stored as the normal image in image memory 12 without any flag being set in marking region 10b (steps ST9, ST10 and ST11).

Figure 7:
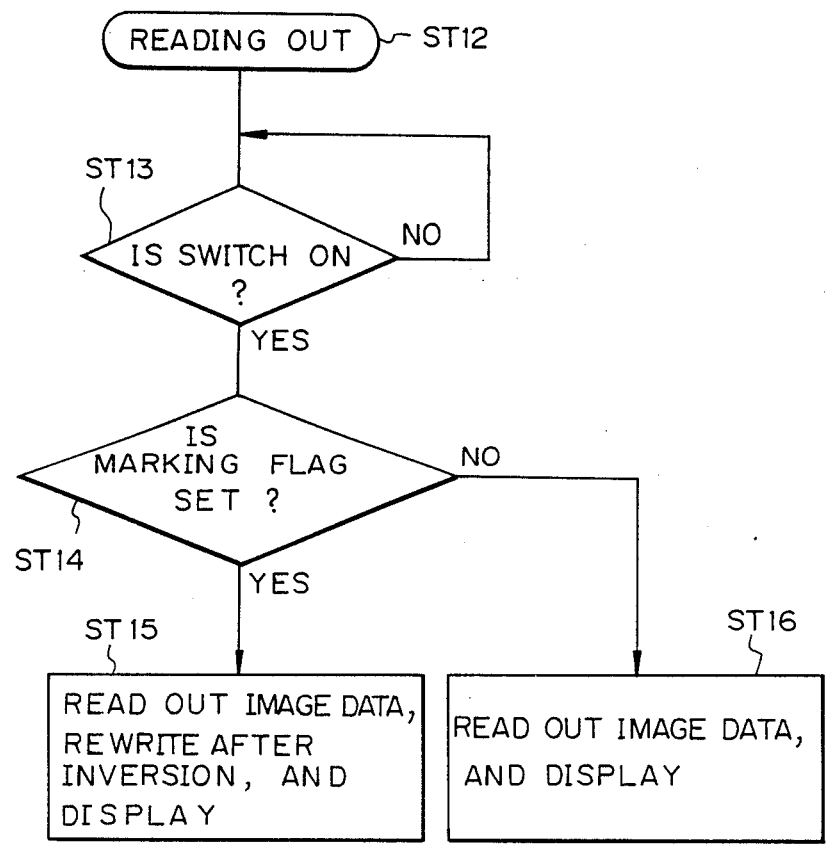
FIG. 7 is a flowchart showing an operation for reading out the image data stored in the memory.

Now, the operation of reading out the stored image data will be described. Referring to FIG. 7, the operation starts with turning on a readout switch (not shown) (steps ST12 and ST13). Upon receiving a readout switch signal, microcomputer 14 confirms whether or not the flag is set in marking region 10b of image register 10. If flagged (step ST14), the image data is temporarily read out from image memory 12 and is rewritten as a reflected image after inversion in a free region within image memory 12. Then, the reflected image is read out therefrom and displayed on CRT display 4 (step ST15).

If marking region 10b is not flagged, the image data is read out from image memory 12 and displayed as a true image directly on CRT display 4 (step ST16).

It is to be noted that, although in the aforementioned embodiment detecting means 9 consists of light emitting and detecting element, it may involve use of a contact type micro-switch or the like.

As discussed above, the present invention provides the following effects. Since the TV camera is detachably mounted on the visual telephone body and the state of the TV camera is automatically detected, the entire videophone need not be moved for imaging subjects other than the user. This arrangement enables the TV camera to be directed toward other subjects with ease. Besides this, the image data of the user's image generated by the TV camera while it is accommodated in the videophone is displayed as a reflected image. On the other hand, the image data generated by the TV camera while it is separated from the telephone body and the image data transmitted from the other party in video telephone communication with the user are displayed as "true" images so that a natural display can be obtained.

What is claimed is:

1. A videophone comprising:
   a TV camera detachably accommodated in the unit of said videophone, said TV camera being connected to the videophone unit through a cable;
   means for displaying image data picked-up by said TV camera or image data transmitted through a telephone line; and
   means for detecting whether or not said TV camera is fixed in the videophone unit;
   the image displayed on said displaying means being automatically switched between a reflected image and a true image in response to the output from said detecting means.

2. A videophone comprising:
   a TV camera connected via a signal cable to a videophone unit and detachably accommodated in said videophone;
   a detecting means for detecting whether or not said TV camera is accommodated in said videophone unit;
   an image display means for displaying image data generated by said TV camera or image data transmitted through a telephone line;
   an image memory for storing said image data; and
   an image processing means for processing said image data generated by said TV camera to be displayed as a reflected image on said image display means and for storing in said image memory the image data with a flag indicative of the fact that said TV camera is fixed within said videophone when receiving a detecting signal indicative of the fact that said TV camera is accommodated with said videophone from said detecting means, said image processing means displaying said image data as a reflected image on said image display means when said image data read out from said image memory is flagged, and said image processing means displaying said image data on said image display means as true images when both said image data is generated by said TV camera when detached from said videophone and said image data is transmitted through said telephone line.

3. A videophone comprising, a videophone unit having an image display means, a TV camera, said videophone unit having means for detachably receiving said TV camera, said TV camera having a cable for coupling to said videophone unit, said TV camera adapted to be either in a received position at said videophone unit or detached therefrom, control means for displaying image date on said image display means either picked up by said TV camera or received from a telephone line, means for detecting whether or not said TV camera is in the received position, wherein said means for detecting includes light path detection means.

4. A videophone comprising, a videophone unit having an image display means, a TV camera, said videophone unit having means for detachably receiving said TV camera, said TV camera having a cable for coupling to said videophone unit, said TV camera adapted to be either in a received position at said videophone unit or detached therefrom, control means for displaying image date on said image display means either picked up by said TV camera or received from a telephone line, means for detecting whether or not said TV camera is in the received position, wherein said control means for displaying image data is controlled to switch between true and reflected images in response to the output from said detecting means.

5. A videophone as set forth in claim 4 wherein the control means displays a reflected image when the camera is in its received position and displays a true image when the camera is in its detached position.

6. A videophone as set forth in claim 4 wherein the control means includes an image memory and image processing means.

7. A videophone as set forth in claim 6 wherein the image processing means is for processing said image data generated by said TV camera to be displayed as a reflected image on said image display means and for storing in said image memory, the image data with a flag indicative of the fact that the TV camera is in its received position.

8. A videophone as set forth in claim 7 wherein the image processing means displays the image data as a reflected image on the image display means when the image data read out from the image memory is flagged.

9. A videophone as set forth in claim 8 wherein the image processing means displays the image data on the image display means as true images when both the image data is generated by the TV camera when detached from the videophone unit and the image data is transmitted through the telephone line.

* * * * *